June 22, 1965
R. G. HOLZ
3,190,125
APPARATUS FOR THE MEASUREMENT OF THE RELATIVE AXIAL DISPLACEMENT OF A ROTOR AND A STATOR
Filed Oct. 27, 1961
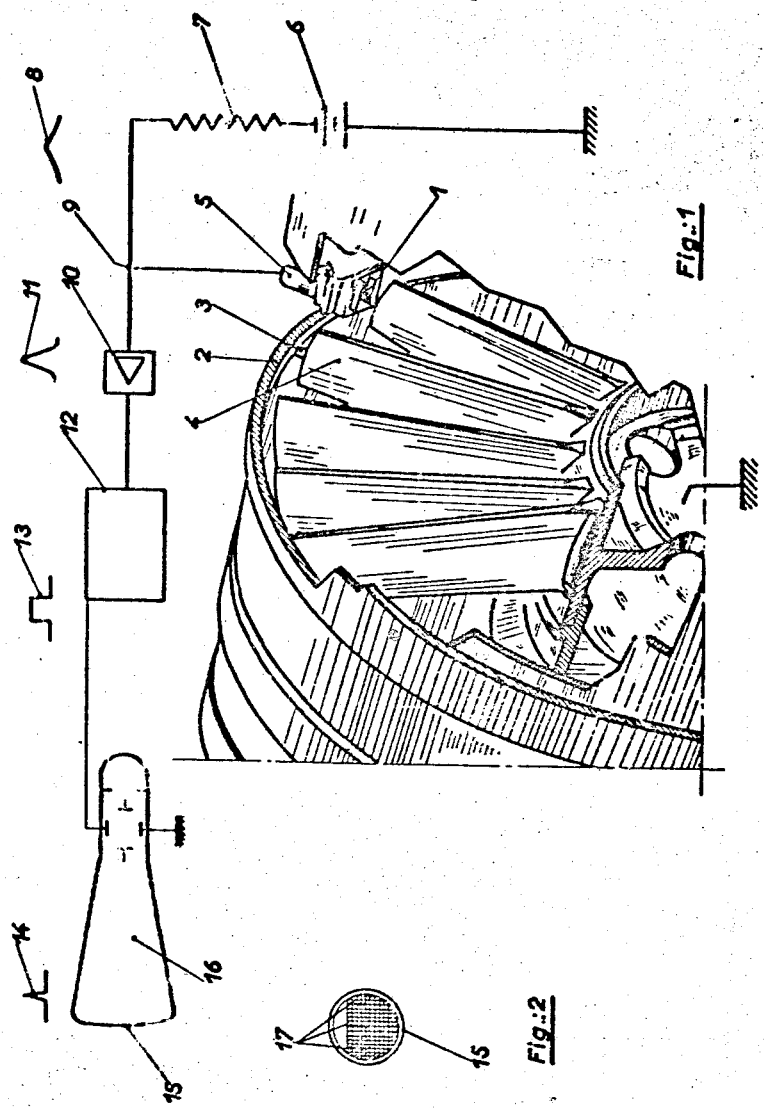
INVENTOR
Robert G. Holz
Cole, Grindle & Watson
ATTORNEYS

United States Patent Office 3,190,125
Patented June 22, 1965

3,190,125
APPARATUS FOR THE MEASUREMENT OF THE RELATIVE AXIAL DISPLACEMENT OF A ROTOR AND A STATOR
Robert Gustave Holz, Draveil, Seine et Oise, France, assignor to Societe Nationale d'Etude et de Construction de Moteurs d'Aviation, Paris, France, a company of France
Filed Oct. 27, 1961, Ser. No. 148,121
Claims priority, application France, Nov. 7, 1960, 843,196
3 Claims. (Cl. 73—432)

The adaptation of the aviation turbo-reactor to flight at very high speeds has resulted in the progressive elimination of light alloys for the moving parts, by reason of the creep facilitated by kinetic heating, whereas, for considerations of weight, light alloys have been retained as far as possible for the fixed parts. This results in considerable differences in expansion necessitating an increase in the clearances, which is always disadvantageous from the performance point of view.

It is, however, important to have an exact knowledge of the variation of the clearances depending on the state and the conditions of operation, in order to determine the dimensions precisely.

The present invention makes it possible to measure instantaneously the relative axial displacement between the rotor and the stator of a turbine, especially of a gas turbine, such measurement being particularly difficult in view of the very exacting conditions of temperature and of vibration.

In accordance with the present invention, the passage of a rotor blade is detected on the one hand in front of a straight reference line parallel to the axis of rotation, and on the other hand in front of a line inclined to the said reference line, and the time taken for the blade to pass between these two lines is measured.

The present invention has also for its object an electronic device for carrying this method into effect, which device comprises an electrode mounted on the stator of the machine facing the rotating blades and constituted by at least one rectilinear branch parallel to the axis of rotation and a second branch inclined with respect to the first, the said electrode co-operating with a second electrode placed at the extremity of a rotor blade and which therefore passes in front of the first electrode in such manner as to generate, in an external circuit connected to the said electrodes, an impulse on the passage of the rotating electrode in front of each branch of the fixed electrode, the said circuit terminating in an oscilloscope or other adequate apparatus adapted to measure the interval of time between two successive impulses.

According to one form of construction of this device, the fixed electrode comprises three branches, of which two are parallel to the axis of rotation of the machine, the third branch being inclined and located in the space between these two parallel branches. The inclined branch will also preferably be straight and its inclination will preferably be 45°.

In order to simplify the design of the electronic circuit, the present invention provides for the connection to earth of the rotating electrode through the intermediary of the rotor bearings.

The description which follows below with reference to the accompanying drawings (which are given by way of example only and not in any limitative sense), will make it quite clear how the invention can be carried into effect, the special features which are brought out either in the text or in the drawings being understood to form a part of the said invention.

FIG. 1 is a perspective view of the turbine with part of the casing broken away, this view being completed by a connection diagram of the measuring circuit.

FIG. 2 is a view of the oscilloscope screen.

In the form of embodiment illustrated in the drawings, the fixed electrode 1 is in the form of a Z and comprises two ribs parallel to the axis of the turbine and an intermediate rib arranged at 45° to the first two. This electrode is mounted on the inner face of the fixed ring 2 of the turbine and is insulated from earth and connected to a terminal 5 on the exterior of this ring. The moving electrode 3 is constituted by a small pin mounted at the periphery of one blade 4 of the rotor.

The moving electrode 3 is connected to earth through the intermediary of the bearings of the rotor shaft, while the fixed electrode 1 is put under tension by connecting the terminal 5 to a current supply 6 through the agency of a resistance 7. An electric circuit is thus produced comprising an air-gap formed between the pin 3 and the wall of the fixed ring 2. This air-gap, constant over the greater part of a revolution of the rotor, is reduced abruptly three times in each revolution, at the moment of the passage of the pin 3 in front of the three ribs of the Z-shaped electrode 1.

These variations in air-gap result in variations of capacity which result in the production of impulses in the electric circuit: three impulses for each complete revolution of the rotor.

These impulses of rounded shape, as shown at 8, are collected at a point 9 of the circuit, applied to an amplifier 10 supplying amplified impulses 11 which are limited in amplitude in a shaping stage 12 to produce a rectangular signal 13. The latter is in turn rendered narrower to produce a short impulse 14 which is reproduced on the screen 15 of an oscilloscope 16. By suitably adjusting the oscilloscope, three lines 17 will be caused to appear on the screen, as shown in FIG. 2, the position of each line corresponding to a definite instant.

The device which has just been described operates in the following manner:

During a relative axial displacement of the rotor and the stator of the turbine, the first and third impulses generated at each revolution of the rotor during the passage of the pin 3 in front of the two ribs of the electrode 1 parallel to the axis, are not affected and in consequence, the first and third lines 17 on the screen 15 of the oscilloscope will remain fixed, on the condition of course that the speed of rotation is constant (these two lines will approach each other in the event of acceleration and conversely will move further apart in case of deceleration). On the other hand, the second impulse generated by the passage of the pin 3 in front of the inclined diagonal rib of the Z will vary as a function of the amount of axial displacement, and the second line 17 appearing on the screen 15 will approach one or the other of the end lines, depending on the case. Thus, the speed of rotation at any instant can be deduced from the distance between the first and the third lines 17, while the axial displacement of the rotor is deduced from the distance separating the first and second lines.

At a stable speed, adjustment of the scanning permits a suitable position of the third impulse to be chosen, the distance between this latter and the first being constant in respect of time. The scale thus chosen enables the axial displacement of the rotor to be deduced by simply measuring the displacement of the second impulse.

In other words, the end impulses constitute a continuous calibration, and the central impulse indicates the axial position of the turbine wheel.

It will be noted that the measurement is independent of the evolution of the radial clearance, since the value of the voltage generated is not taken into consideration.

It should also be observed that the choice of an angle of 45° for the inclination of the diagonal rib of the Z enables the measurement of the axial displacement to be replaced by that of the corresponding transverse displacement, without introducing any factor of proportionality due to the slope of the said inclined rib.

The circuit described above has the advantage that it necessitates only the connection of a single wire on the turbine, and furthermore only on a fixed portion. The pre-amplifier stage installed in close proximity is of very small size. The other apparatus can be located at a distance, for example in the measuring instrument room.

It will of course be understood that modifications may be made to the form of embodiment which has just been described, in particular by the substitution of equivalent technical means, without thereby departing from the scope of the present invention.

What I claim is:

1. In a rotating machine comprising as members rotating with respect to each other a rotor and a stator, a device for indicating the axial position of the rotor with respect to the stator which comprises: a first electrode located on the periphery of one of said members and comprising three branches, two of which are parallel and at an angle to the transverse rotation planes of the rotor and the third of which is at an angle to these two branches and to the transverse rotation planes of the rotor; a second electrode located on the periphery of said other member in a transverse plane crossing said three branches; elements connected to the two electrodes respectively and adapted to complete an electric circuit when said second electrode faces a branch of said first electrode; and an indicating apparatus connected to said electric circuit for indicating the instants when the second electrode is opposite a branch of the first electrode.

2. A device as set forth in claim 1 in which said two parallel branches of said first electrode are parallel to the axis of rotation of the rotor and said third branch forms at an angle of about 45° with said two parallel branches.

3. A device as set forth in claim 1 in which the electrode located on the periphery of the stator is connected to earth through the intermediary of the rotor bearings whereas the electrode located on the periphery of the stator is put under tension.

References Cited by the Examiner
UNITED STATES PATENTS

| | | | |
|---|---|---|---|
| 1,779,783 | 10/30 | Sylvander et al. | 324—70 |
| 1,793,989 | 2/31 | Barr | 200—25 |
| 2,575,710 | 11/51 | Hardigg | 73—71.4 |
| 2,828,626 | 4/58 | Samsel | 324—70 |
| 2,829,825 | 4/58 | Doll | 340—206 X |
| 2,913,662 | 11/59 | Hogan | 324—70 |
| 2,937,239 | 5/60 | Garber et al. | 324—83 |
| 2,983,141 | 5/61 | Vanator | 73—162 |
| 3,058,339 | 10/62 | Shapiro | 73—71.4 |

FOREIGN PATENTS 204,503  11/56  Australia.

RICHARD C. QUEISSER, *Primary Examiner*.
ROBERT L. EVANS, JAMES GILL, *Examiners*.